(12) United States Patent
Gibson et al.

(10) Patent No.: US 11,460,175 B2
(45) Date of Patent: Oct. 4, 2022

(54) REVERSIBLE MOUNTING ARM FOR POLE-MOUNTED LIGHT FIXTURES

(71) Applicant: ABL IP Holding LLC, Atlanta, GA (US)

(72) Inventors: Jon Eric Gibson, Covington, GA (US); Eric Chang, Buford, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 17/144,603

(22) Filed: Jan. 8, 2021

(65) Prior Publication Data

US 2022/0221138 A1 Jul. 14, 2022

(51) Int. Cl.
- *F21V 21/108* (2006.01)
- *F21V 21/116* (2006.01)
- *F16M 13/02* (2006.01)

(52) U.S. Cl.
CPC ........... *F21V 21/108* (2013.01); *F16M 13/02* (2013.01); *F21V 21/116* (2013.01); *F16M 2200/06* (2013.01)

(58) Field of Classification Search
CPC ..... F21V 21/108; F21V 21/116; F21M 13/02; F21M 2200/06
USPC .................................. 362/431, 410, 368, 370
See application file for complete search history.

(56) References Cited

U.S. PATENT DOCUMENTS

| | | |
|---|---|---|
| 3,543,017 A | 11/1970 | Mihailoff |
| D663,462 S | 7/2012 | Butler et al. |
| 8,210,722 B2 | 7/2012 | Holder et al. |
| 8,414,161 B2 | 4/2013 | Holder et al. |
| 8,434,912 B2 | 5/2013 | Holder et al. |
| 8,511,864 B2 | 8/2013 | Holder et al. |
| 8,851,711 B2 | 10/2014 | Ladewig et al. |
| 8,899,786 B1 | 12/2014 | Moghal et al. |
| 8,905,597 B2 | 12/2014 | Holder et al. |
| 9,052,086 B2 | 6/2015 | Broughton |
| 9,121,582 B2 | 9/2015 | Kinnune et al. |
| 9,140,430 B2 | 9/2015 | Broughton |
| 9,212,795 B2 | 12/2015 | Ladewig et al. |
| 9,291,317 B2 | 3/2016 | Winters |
| 9,297,520 B2 | 3/2016 | Holder et al. |
| 9,377,173 B2 | 6/2016 | Lehman et al. |
| 9,388,949 B2 | 7/2016 | Holder et al. |
| D766,485 S | 9/2016 | Ladewig et al. |
| 9,435,510 B2 | 9/2016 | Broughton |

(Continued)

OTHER PUBLICATIONS

150-Watt LED NextGen II Parking Lot Light—20,000 Lumen—5000K—ARM Mount—without Photocell, LED Light Expert.com, Accessed from internet on Apr. 1, 2021, 6 pages.

(Continued)

*Primary Examiner* — Laura K Tso
(74) *Attorney, Agent, or Firm* — Kilpatrick Townsend & Stockton LLP

(57) ABSTRACT

A reversible mounting arm that is universal in that it can be used to mount a light fixture to either a flat or curved mounting surface, such as, but not limited to, a round or rectilinear-shaped pole. More specifically, one end of the mounting arm is designed for mating with a round pole having a curved sidewall (or other curved mounting surfaces) whereas the opposing end of the mounting arm is designed for mating with poles having a flat sidewall (or other flat mounting surfaces).

22 Claims, 13 Drawing Sheets

(56) References Cited

U.S. PATENT DOCUMENTS

| | | | |
|---|---|---|---|
| 9,494,283 B2 | 11/2016 | Broughton | |
| 9,494,309 B2 | 11/2016 | Ladewig et al. | |
| 9,574,746 B2 | 2/2017 | Broughton | |
| 9,638,407 B2 | 5/2017 | Winters | |
| D793,601 S | 8/2017 | Ladewig et al. | |
| 9,719,672 B1 | 8/2017 | Moghal et al. | |
| 9,835,314 B1* | 12/2017 | Wright | F21V 21/02 |
| 9,879,849 B2 | 1/2018 | Kinnune et al. | |
| 2001/0018978 A1* | 9/2001 | Gordin | E04H 12/2253 |
| | | | 174/2 |
| 2004/0061032 A1* | 4/2004 | Bradford | F21V 23/06 |
| | | | 248/218.4 |
| 2010/0008571 A1 | 1/2010 | Lan et al. | |
| 2010/0110684 A1 | 5/2010 | Abdelsamed et al. | |
| 2011/0187270 A1* | 8/2011 | Summerford | F21V 21/108 |
| | | | 315/113 |
| 2011/0211330 A1 | 9/2011 | Wang | |
| 2013/0027937 A1* | 1/2013 | Winters | F21V 29/713 |
| | | | 362/249.01 |
| 2020/0240620 A1* | 7/2020 | Chamberlain | F21V 15/01 |
| 2020/0278109 A1 | 9/2020 | Ladewig et al. | |

OTHER PUBLICATIONS

Lumark PRV / PRV-XL Prevail LED, Cooper Lighting Solutions, Aug. 20, 2020, pp. 1-5.
Application No. CA 3111267, Office Action, dated May 26, 2022, 3 pages.

\* cited by examiner

REVERSIBLE MOUNTING ARM FOR POLE-MOUNTED LIGHT FIXTURES

FIELD

Embodiments of the invention relate to a reversible mounting arm that can be used to mount a light fixture to a curved or flat mounting surface.

BACKGROUND OF THE INVENTION

Many light fixtures, particularly outdoor fixtures, are mounted to a pole with a mounting arm. Power comes up the pole and the wires from the light fixture extend through the mounting arm to electrically connect with power in the pole so as to power the light source(s) in the light fixture.

Traditionally, different mounting arms have been provided depending on the shape of the pole onto which the light fixture is to be mounted. For example, end edges of a mounting arm designed to mate with a rectilinear-shaped pole need to be straight whereas end edges of a mounting arm designed to mate with a round pole need to be curved. In this way, the end of the mounting arm joins flush with the pole to create a seal between the two to prevent ingress of water and other contaminants harmful to the wiring as well as to impart a polished appearance to the assembly.

Mounting arms designed to mate with a particular pole geometry have also be provided with accessories that can be used to adapt the mounting arm for use with different pole geometries. However, such accessories add both expense to the assembly and complexity to the installation process.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention provide a reversible mounting arm that is universal in that it can be used to mount a light fixture to either a flat or curved mounting surface, such as, but not limited to, a round or rectilinear-shaped pole. More specifically, one end of the mounting arm is designed for mating with a round pole having a curved sidewall (or other curved mounting surfaces) whereas the opposing end of the mounting arm is designed for mating with poles having a flat sidewall (or other flat mounting surfaces). The mounting arm is integral and can come ready for use with different pole geometries without requiring any accessories.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention provide a reversible mounting arm that is universal in that it can be used to mount a light fixture to either a flat or curved mounting surface, such as, but not limited to, a round or rectilinear-shaped pole. More specifically, one end of the mounting arm is designed for mating with a round pole having a curved sidewall (or other curved mounting surfaces) whereas the opposing end of the mounting arm is designed for mating with poles having a flat sidewall (or other flat mounting surfaces). The mounting arm is integral and comes ready for use with different pole geometries without requiring any accessories.

Figure 1:
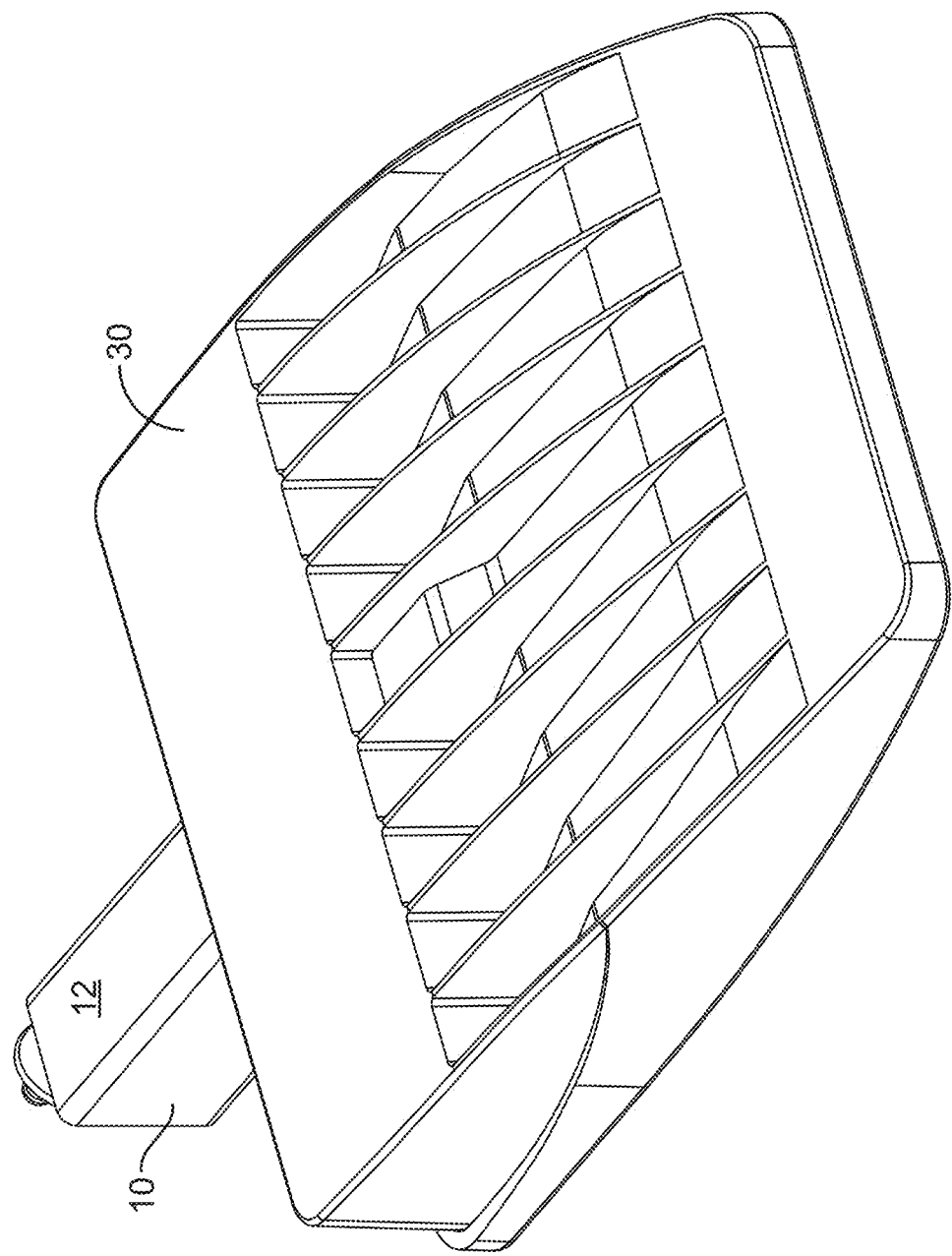
FIG. 1 is a top front perspective view of an embodiment of a mounting arm and light fixture.
Figure 2:
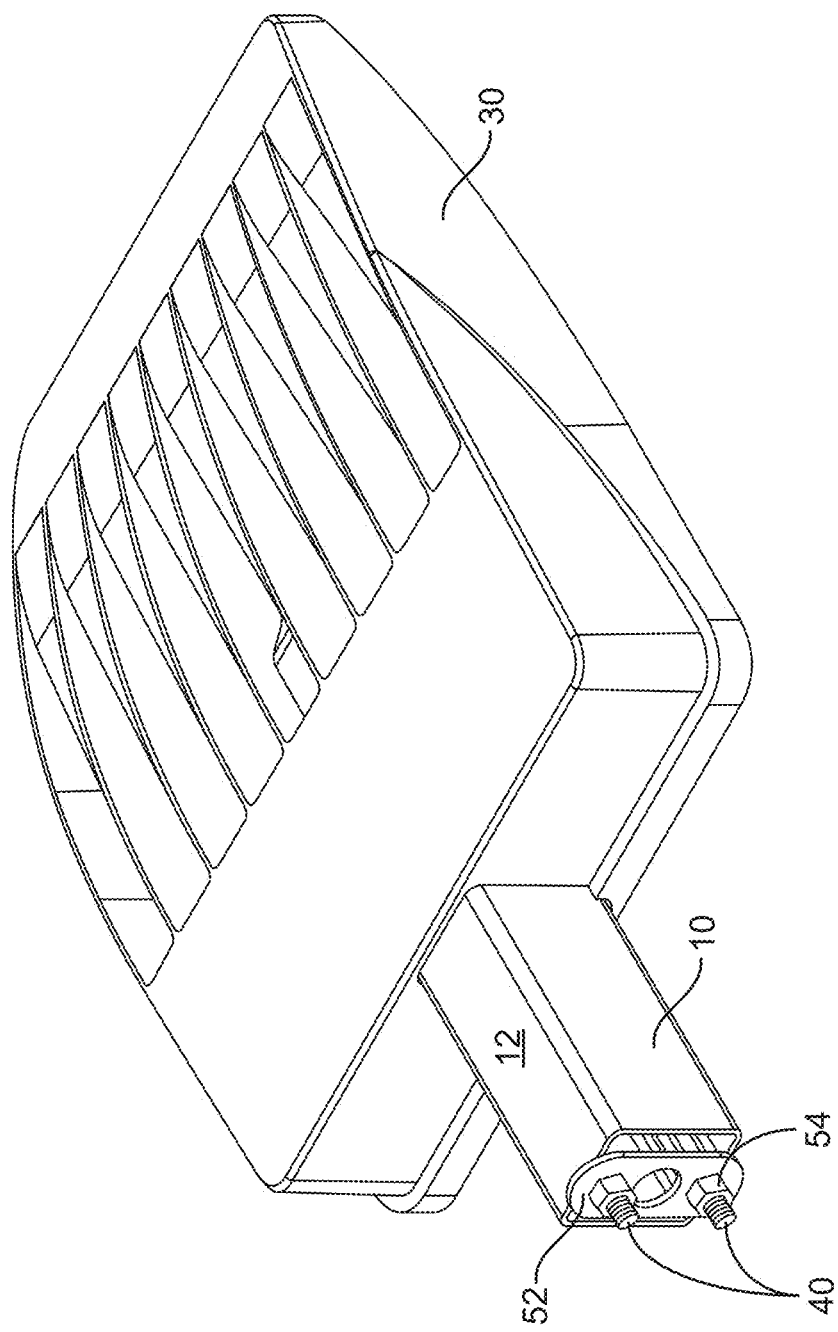
FIG. 2 is a top rear perspective view of the mounting arm and light fixture of FIG. 1.
Figure 3:
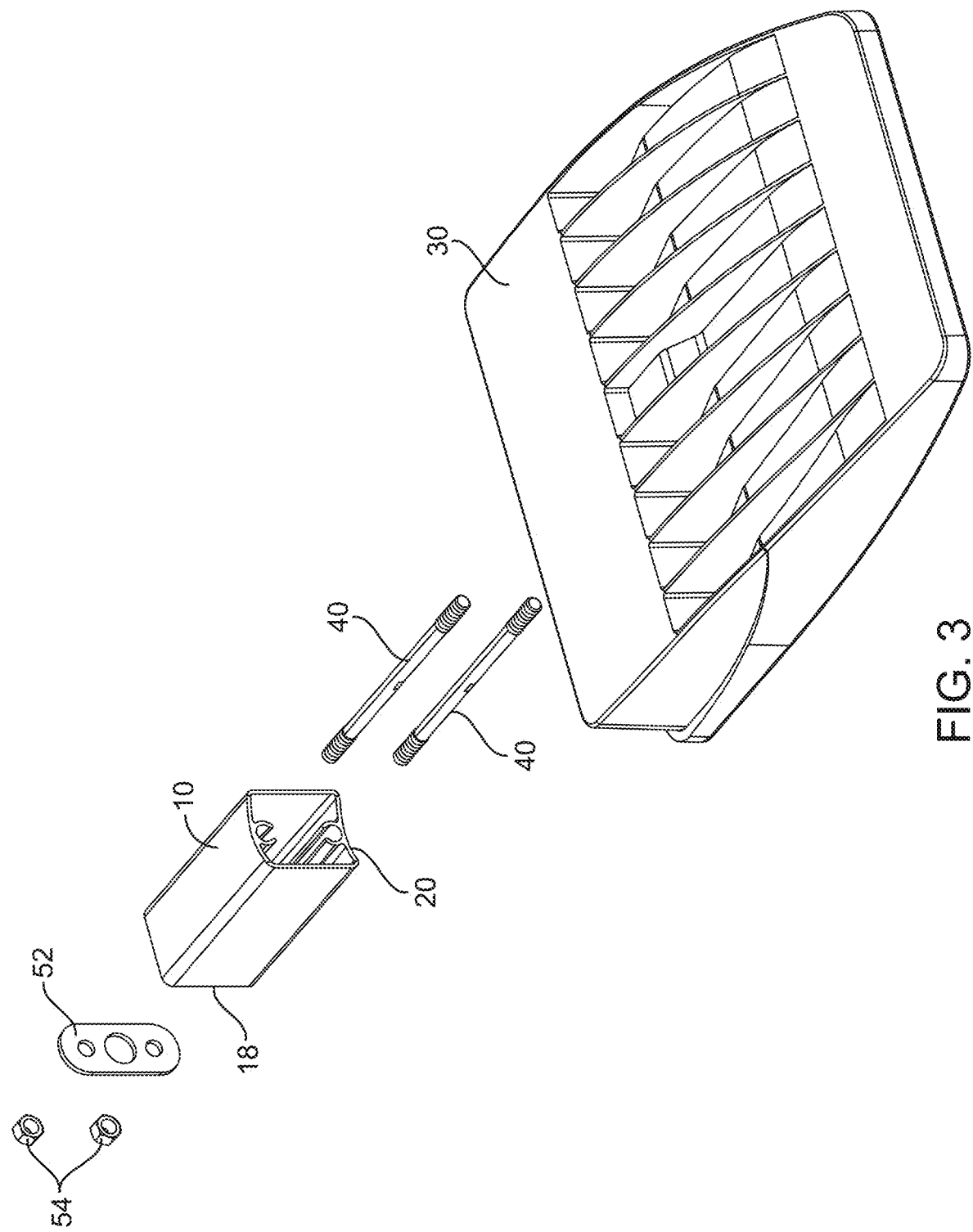
FIG. 3 is an exploded view of the mounting arm and light fixture of FIG. 1.

FIGS. 1-3 show an embodiment of the mounting arm 10 and a light fixture 30. The mounting arm 10 has a mounting arm body 12 that extends along a longitudinal axis. Note that while the mounting arm body 12 is shown as straight and of consistent outer cross-sectional shape or profile, in other embodiments the mounting arm body 12 can be bent, curved, etc. and its outer profile can vary along its length. The mounting arm body 12 can be of any shape provided there is sufficient contact points on each end for engagement with a mounting surface. While the disclosed mounting arm body 12 is shown having a square cross-sectional shape formed with four sidewalls, it other embodiments the mounting arm body 12 has different shapes formed with fewer (e.g., 1, 2, or 3) or more sidewalls.

In the illustrated embodiment (see FIGS. 4-8), the mounting arm body 12 has a generally rectilinear cross-sectional shape or profile defined by sidewalls 14a-14d that terminate in end edges on opposing ends of the mounting arm. The mounting arm body 12 can be generally hollow to permit wires to pass unimpeded between the pole and the light fixture. At least one mounting aperture 16 is provided within the mounting arm body 12. In some embodiments, the mounting aperture 16 has an axis that extends substantially parallel or parallel with the longitudinal axis of the mounting arm body 12. In the illustrated embodiment, two mounting apertures 16 are formed along the inner surface of opposing sidewalls 14a, 14c. However, the number, shape and/or location of the mounting apertures 16 can deviate from what is shown in the figures.

Figure 4:
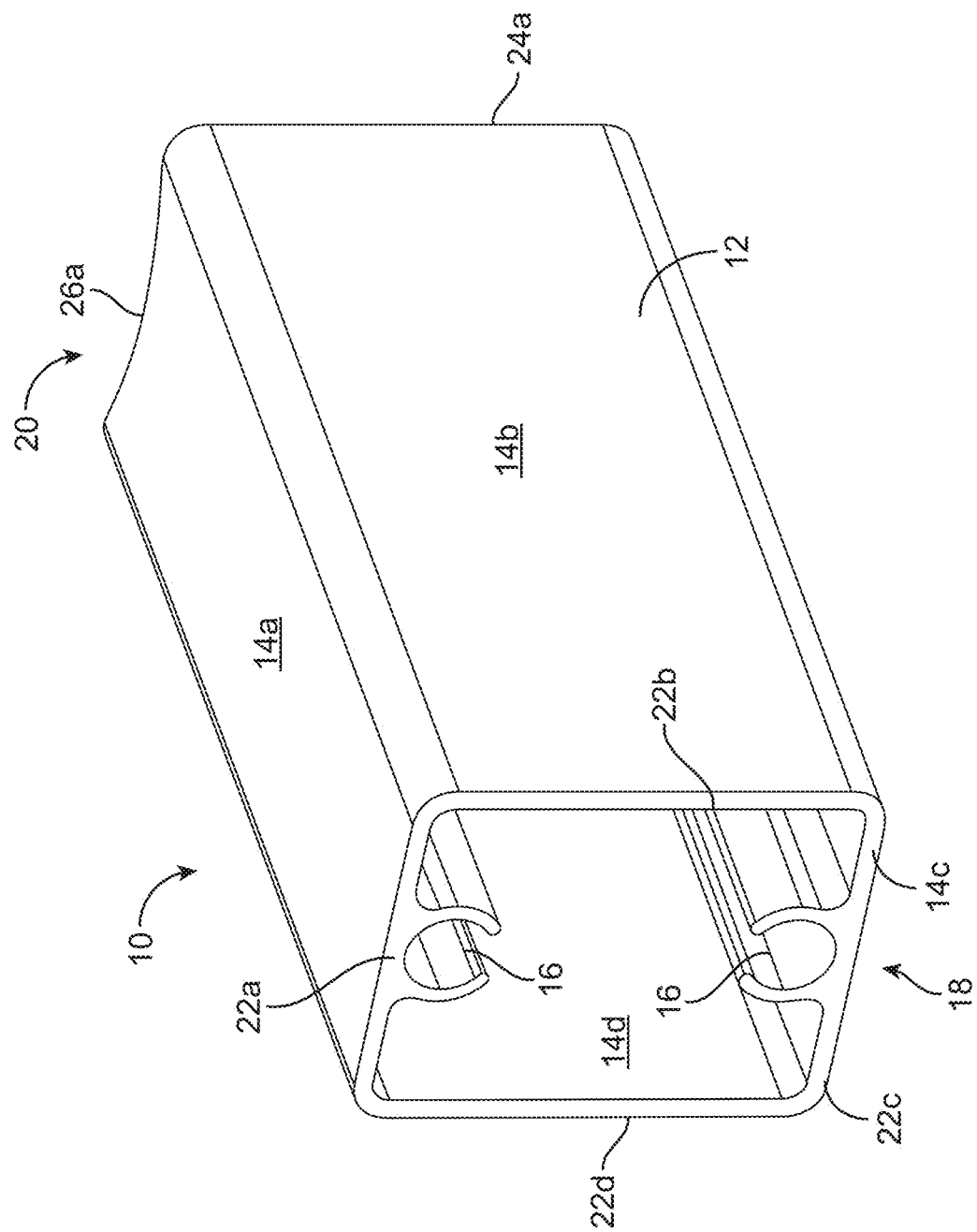
FIG. 4 is a top left perspective view of the mounting arm of FIG. 1 in isolation.
Figure 5:
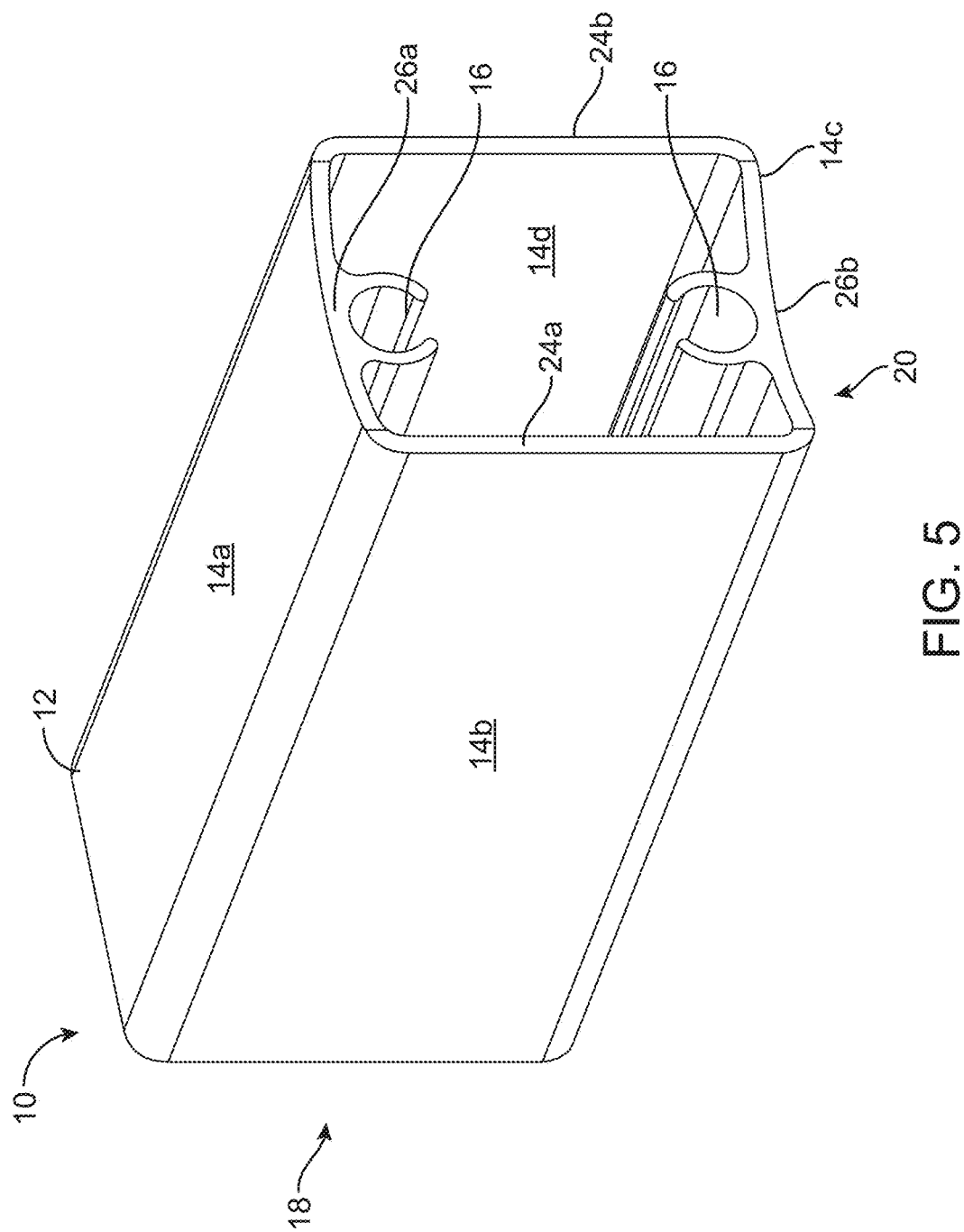
FIG. 5 is a top right perspective view of the mounting arm of FIG. 1 in isolation.
Figure 6:
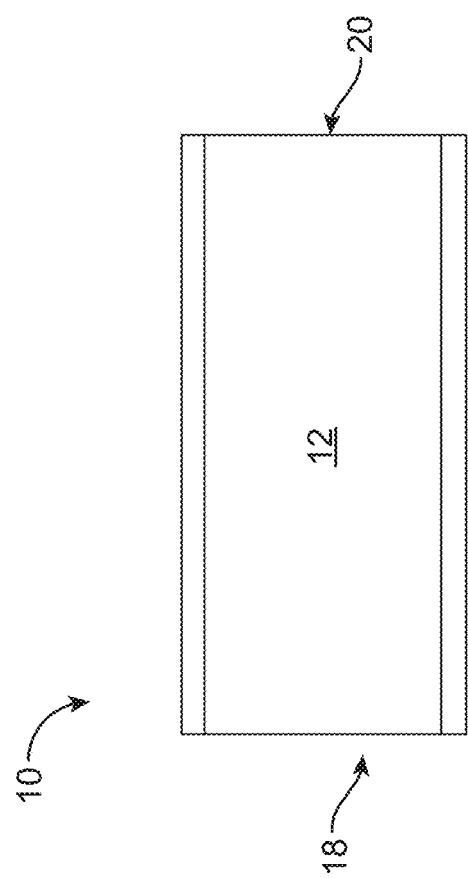
FIG. 6 is a side elevation view of the mounting arm of FIG. 1 in isolation.
Figure 7:
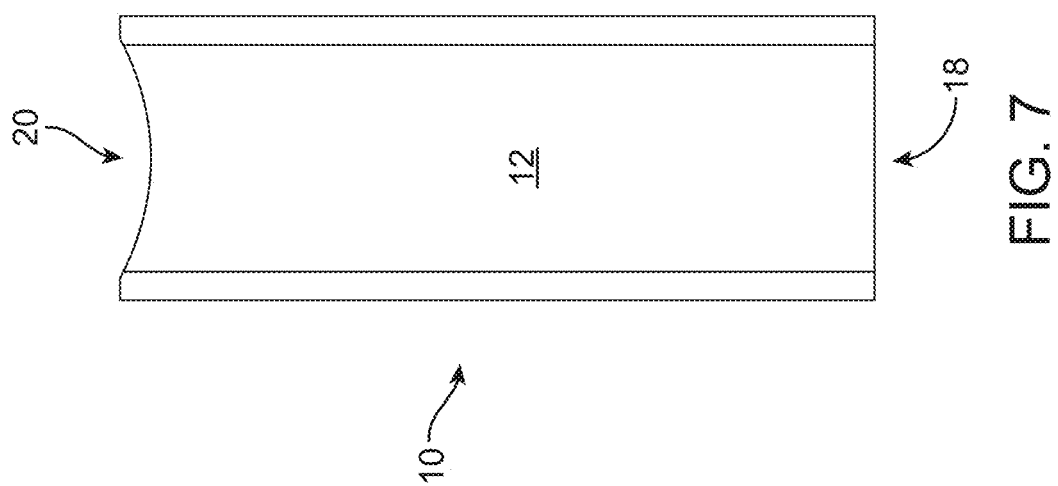
FIG. 7 is a top plan view of the mounting arm of FIG. 1 in isolation.
Figure 8:
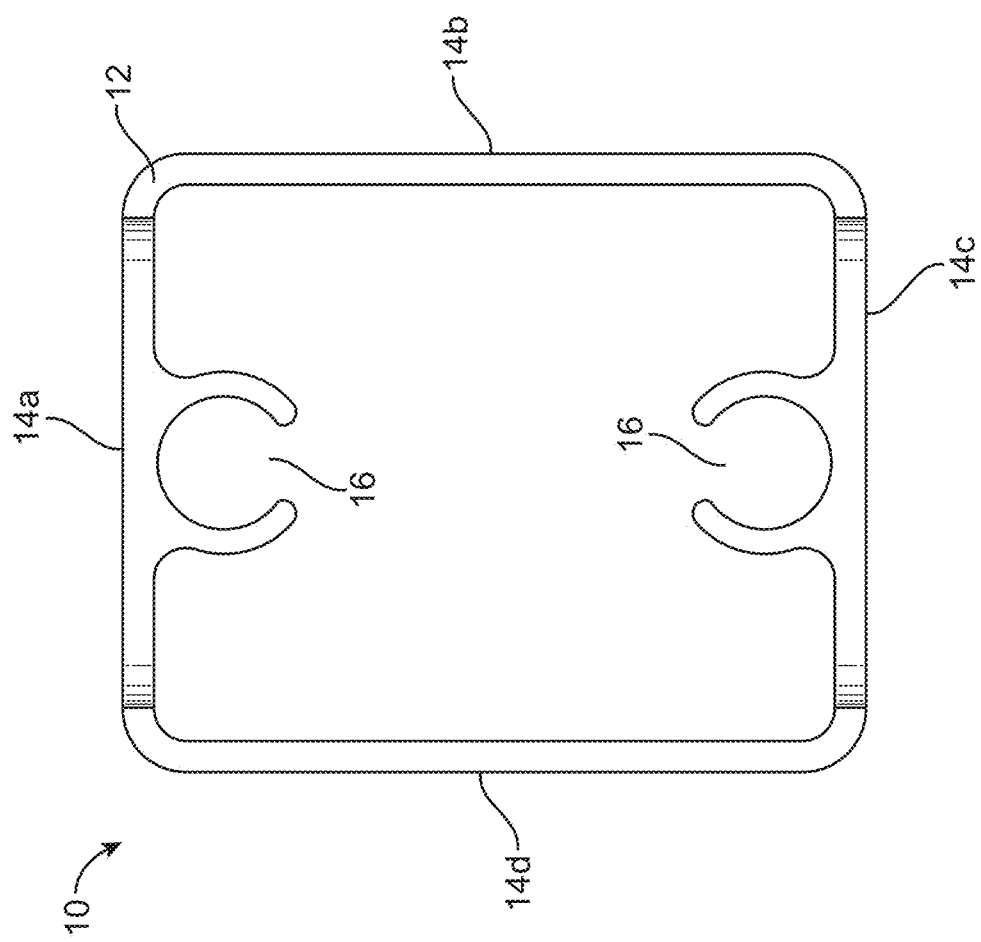
FIG. 8 is an end view of the mounting arm of FIG. 1 in isolation.

As best seen in FIGS. 4, 5, and 7, the mounting arm body 12 includes two ends—a straight end 18 and a curved end 20, each of which is formed integrally in the mounting arm body 12. Each sidewall 14a-14d terminates in a straight edge (edges 22a-22d) at the straight end 18. In contrast, the sidewalls 14a-14d at the curved end 20 terminate in opposing straight edges 24a, 24b and opposing curved edges 26a, 26b that extend between the opposing straight edges 24a, 24b. In some embodiments, the curved edges 26a, 26b curve inwardly in a direction toward the straight end 18 and are symmetrical about the longitudinal axis of the mounting arm 10. The radius of curvature of the curved edges 26a, 26b may be the same or different from each other. In many embodiments, the radius of curvature will be the same. In some embodiments, the radius of curvature of the curved edges 26a, 26b can be between 1 and 6 inches, inclusive; between 1 and 5 inches, inclusive; between 1 and 4 inches, inclusive; between 1 and 3 inches, inclusive; and between 1.5 and 3 inches, inclusive, but these ranges are not limiting. While the mounting arm 10 may be manufactured so that the curved edges 26a, 26b precisely match the curvature of a round pole or other curved mounting surface, in some embodiments a universal mounting arm 10 is provided for use with poles or surfaces with curvatures different from that of curved edges 26a, 26b. For example, a mounting arm 10 having curved edges 26a, 26b sized to fit a small pole diameter can be used on a pole with a larger diameter as there will still be two points of contacts with the pole—i.e., the opposing straight edges 24a, 24b on the curved end 20 of the mounting arm 10 will still contact the pole. Embodiments of the mounting arm 10 disclosed herein may be mounted on poles of any size, including, but not limited to, poles having diameters of 3 to 6 inches. In such embodiments, a gasket can be, but does not have to be, interposed between the pole and mounting arm 10 to seal any gaps between the two.

The mounting arm 10 can be formed of any material having suitable structural integrity to support the weight of a light fixture. Suitable materials may include, but are not limited to, polymeric or metallic (e.g., steel, aluminum, etc.) materials. The mounting arm 10 may be formed using various methods, including, but not limited to, molding, extruding, casting, etc. In some embodiments, the mounting arm 10 is formed from extruded aluminum. Formation via an extrusion process is a cost-effective and simple way to manufacture mounting arms of different lengths. The curved edges 26a, 26b may be formed via machining after the mounting arm has been extruded. However, other means may be used to form the curved edges 26a, 26b.

Figure 9:
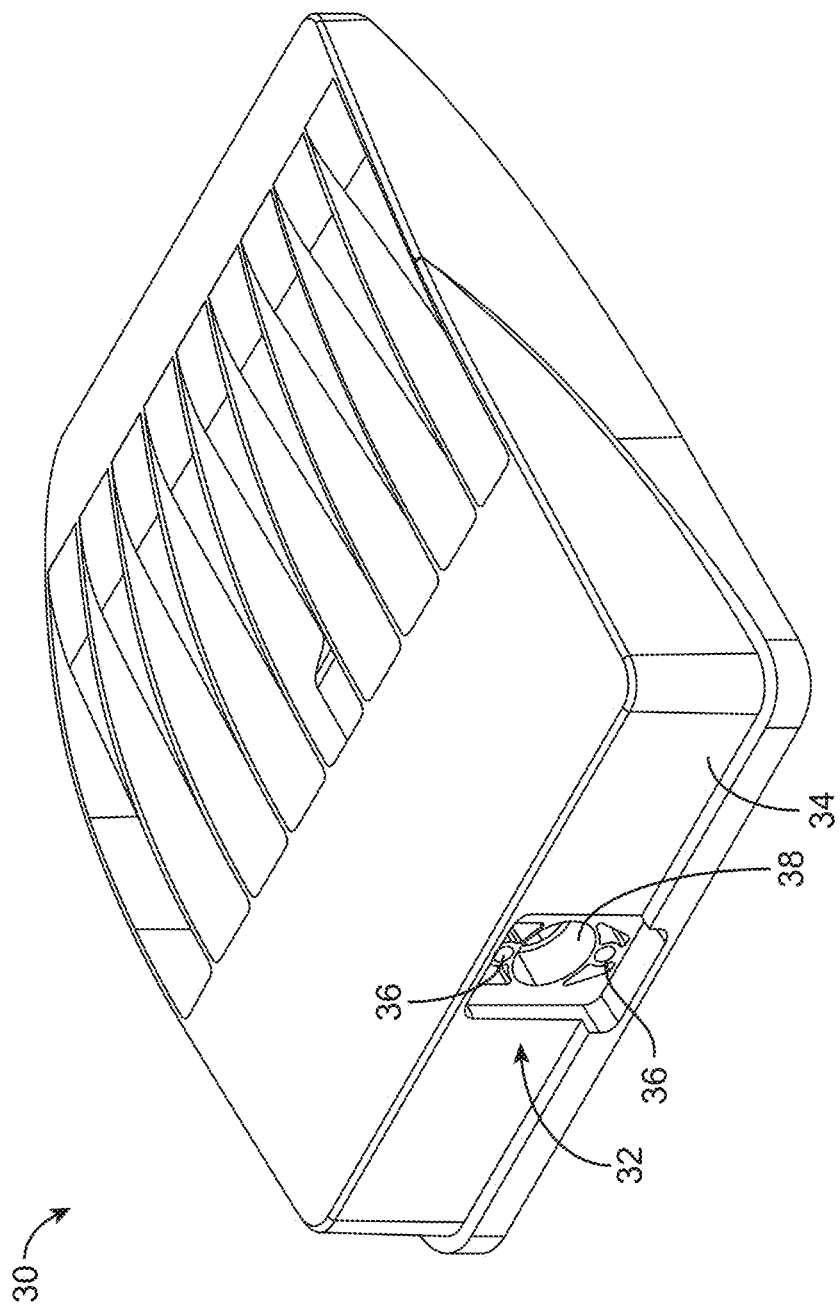
FIG. 9 is a top rear perspective view of the light fixture of FIG. 1 in isolation.
Figure 10:
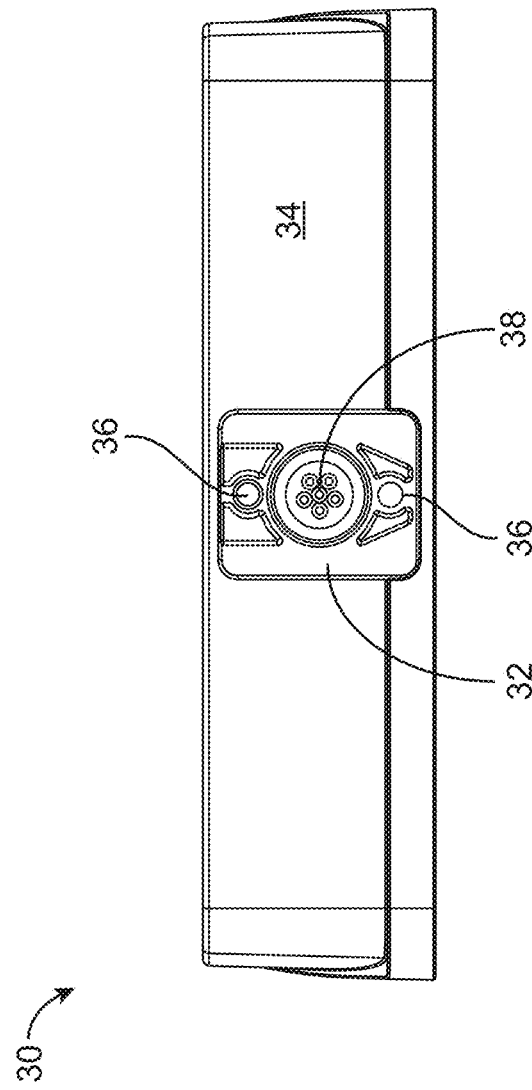
FIG. 10 is a rear elevation view of the light fixture of FIG. 1 in isolation.

FIGS. 9 and 10 show an embodiment of a light fixture 30 to be mounted using the mounting arm 10. The light fixture 30 includes an attachment portion 32 formed in a wall 34 of the light fixture 30. The mounting arm 10 is designed to engage the attachment portion 32 to secure the light fixture to the pole or other mounting surface. The attachment portion 32 can be recessed within the light fixture wall 34 and be shaped to have the same or substantially the same shape as that of the mounting arm 10. In this way, the mounting arm 10 can seat within the recessed attachment portion 32, as discussed in more detail below. The attachment portion 32 also includes one or more securing apertures 36 and a wire aperture 38 through which wiring from the light fixture 30 can pass out of the light fixture 30 and to the pole. The internal surface of the securing apertures 36 can be, but do not have to be, threaded.

In use, the mounting arm 10 is attached to the light fixture 30. Fasteners, such as bolts 40 (see FIG. 3), are secured within the securing apertures 36 in the light fixture 30. If the securing apertures 36 are threaded, the bolts 40 can be screwed directly into the light fixture 30. In other embodiments, the bolts 40 can be passed through the securing apertures 36 and secured in place with nuts.

The mounting arm 10 can then be mated with the light fixture 30 by inserting the bolts 40 through the mounting apertures 16 in the mounting arm 10. If the light fixture 30 is to be mounted on a flat surface (such as a sidewall of a rectilinear pole), the mounting arm 10 is oriented such that the curved end 20 of the mounting arm 10 engages the light fixture 30. For example, in the illustrated embodiment, the curved end 20 is received within the recessed attachment portion 32. In this way, the curved nature of the curved end 20 is concealed and the joint between the light fixture 30 and mounting arm 10 is not exposed, which helps with water shedding and prevents ingress of undesirable elements, such a moisture and dirt, into the joint. If the light fixture 30 is to be mounted on a curved surface (such as a round pole), the orientation of the mounting arm 10 is reversed, with the straight end 18 positioned within the recessed attachment portion 32. The wires from the light fixture 30 are threaded through the mounting arm 10.

The opposing end of the mounting arm (the end that is not mated with the light fixture 30, which can be either the straight end 18 or curved end 20 depending on the geometry of the pole) is then attached to the pole. An aperture (not shown) is provided in the sidewall of the pole. The mounting arm 10 (with associated light fixture 30) is positioned such that the bolts 40 extend through fastener receiving apertures (not shown) in the pole. A securing plate 52 and nuts/washers 54 (see FIG. 3) may be used to lock the bolts 40 into the pole.

Figure 11:
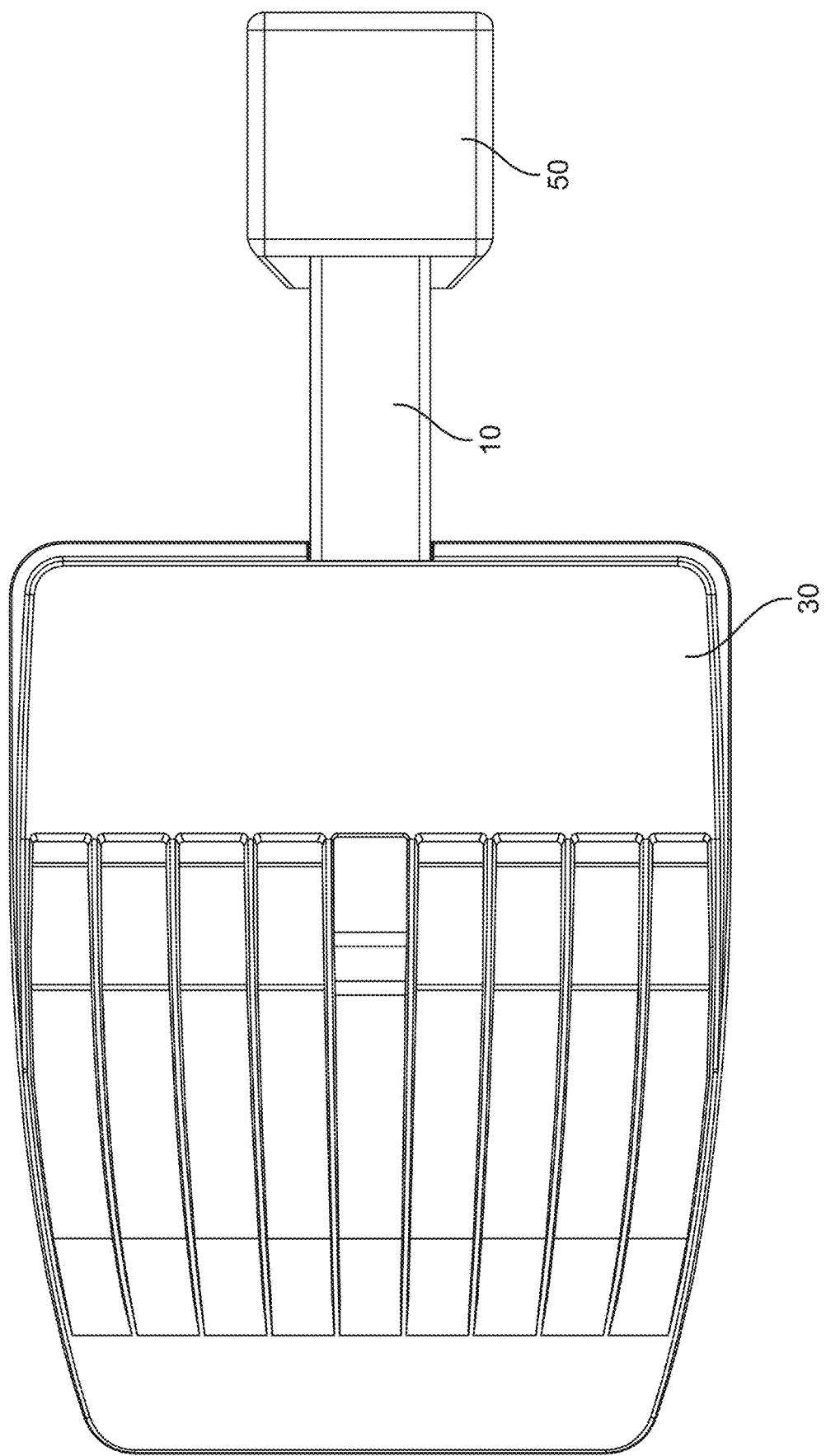
FIG. 11 is a top plan view of the mounting arm and light fixture of FIG. 1 attached to a square pole.
Figure 12:
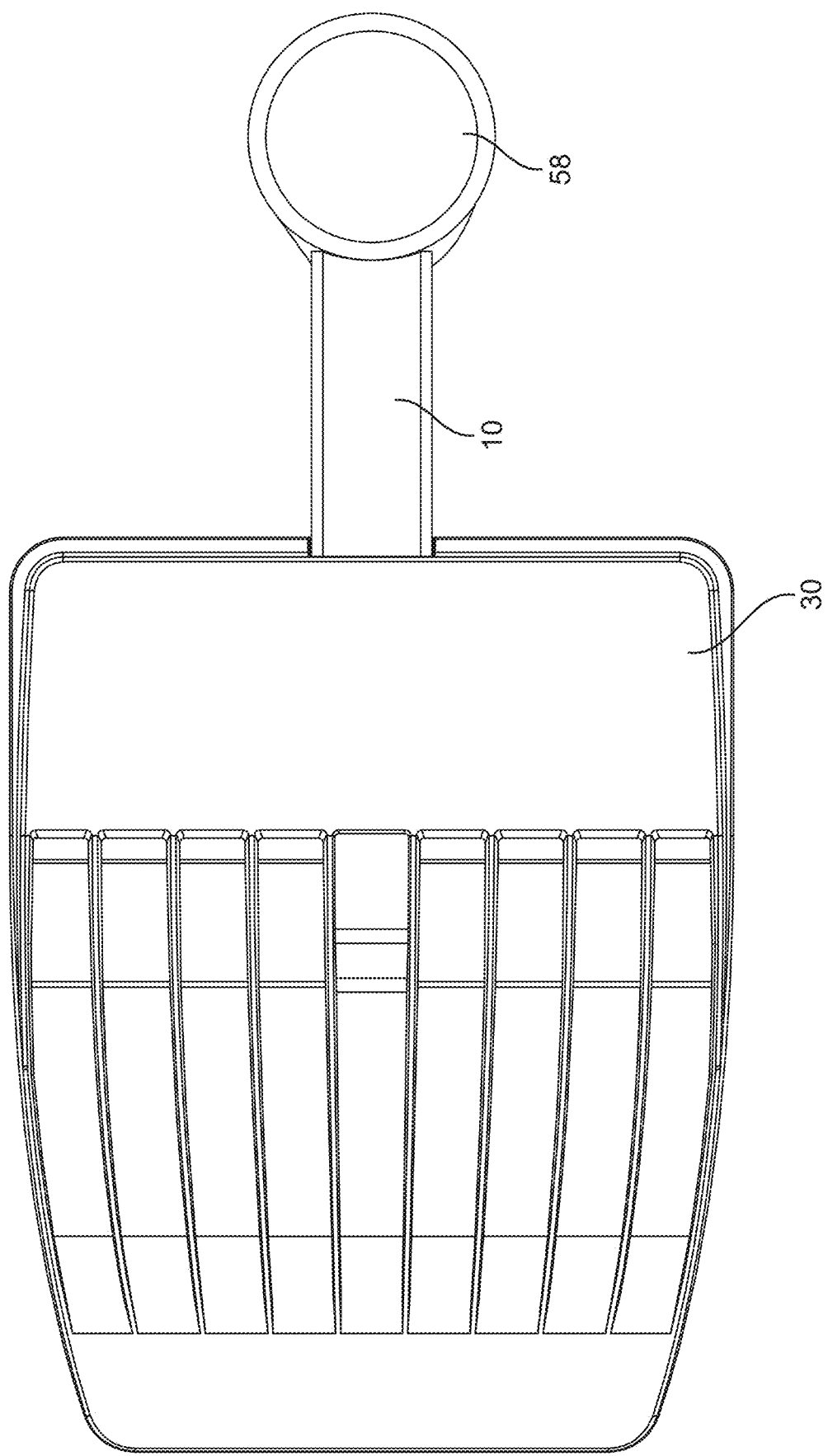
FIG. 12 is a top plan view of the mounting arm and light fixture of FIG. 1 attached to a round pole.

When the mounting arm 10 is attached to a pole having a flat sidewall (such as the square pole 50 shown in FIG. 11), the straight edges 22a-22d of the straight end 18 of mounting arm 10 abut the pole 50. When the mounting arm 10 is attached to a pole having a curved sidewall (such as the round pole 58 shown in FIG. 12), the straight edges 24a, 24b of the curved end 20 of mounting arm 10 abut the pole 58. The curved edges 26a, 26b of the curved end 20 may or may not abut the pole 58 depending on the radius of curvature of each of the curved edges 26a, 26b and the pole 58. A gasket (not shown) can be, but does not have to be, used at the interface between the mounting arm 10 and the pole 50, 58 to seal the joint. The necessary electrical connections are then made within the pole between the power supply in the pole and the wires from the light fixture 30. Installation will typically involve removal of the cap or cover at the top of the pole so as to enable access to the interior of the pole, both for mounting and electrical connection purposes.

Figure 13:
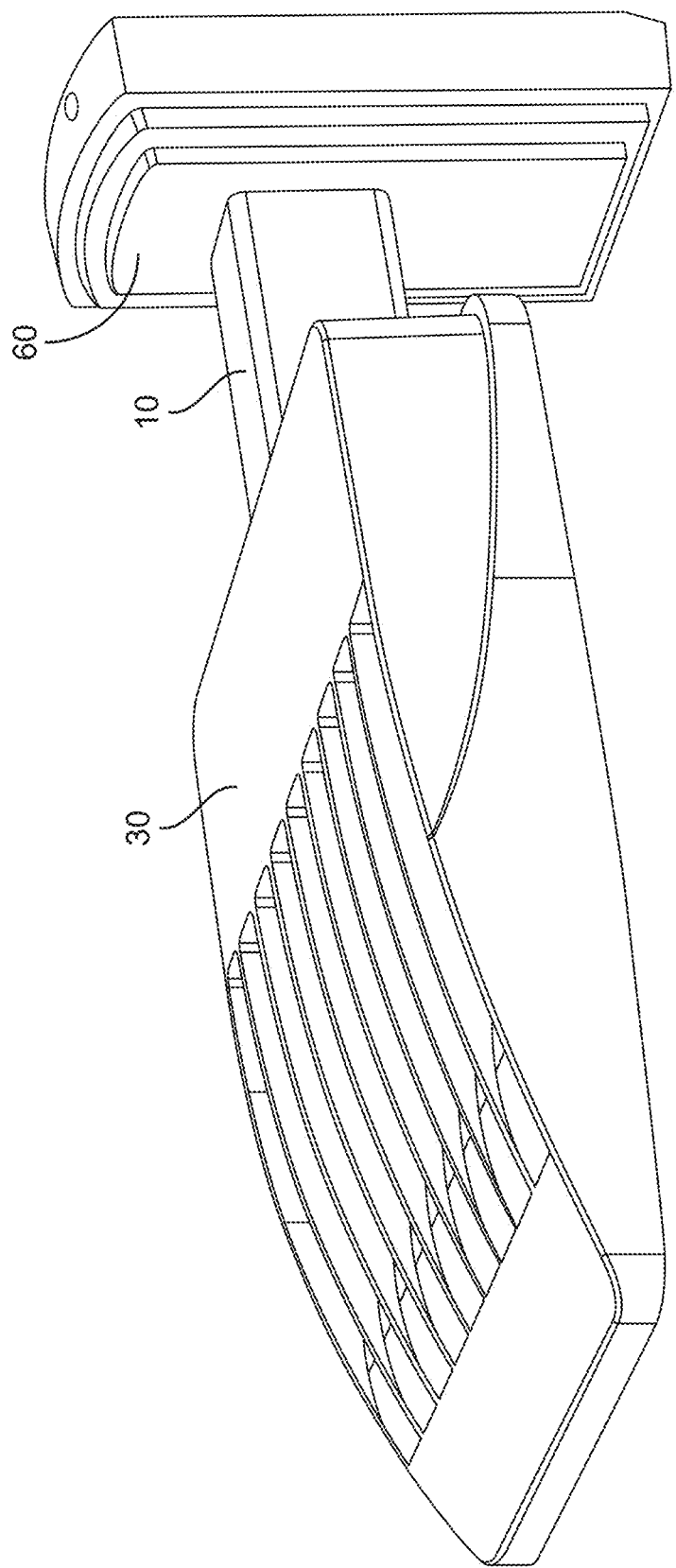
FIG. 13 is a top plan view of the mounting arm and light fixture of FIG. 1 attached to a mounting plate.

While the mounting arm 10 is described for use with a pole, its utility is not so limited. Rather, it can be used to secure a light fixture 30 to any mounting surface, including, but not limited to, walls, ceilings, etc. For example, in some embodiments the mounting arm 10 is used to secure a light fixture 30 to a wall bracket 60 that is attached to a wall (see FIG. 13). Moreover, the mounting arm 10 disclosed herein may be used with any type of light fixture 30 having shapes, sizes, light sources, etc. of any kind. Embodiments of the mounting arm 10 disclosed here are in no way intended to be limited to use with a particular light fixture.

The foregoing is provided for purposes of illustrating, explaining, and describing various embodiments. Having described these embodiments, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the embodiments. Embodiments have been described for illustrative and not restrictive purposes, and alternative embodiments will become apparent to readers of this patent. Accordingly, embodiments are not limited to those described above or depicted in the drawings, and various modifications can be made without departing from the scope of the claims below. Embodiments covered by this patent are defined by the claims below, and not by the brief summary and the detailed description.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A mounting arm for mounting a light fixture to a mounting surface, the mounting arm comprising a plurality of sidewalls that define a substantially hollow mounting arm body extending along a mounting arm axis and having a straight end and a curved end opposite the straight end, wherein each of the plurality of sidewalls terminates at the straight end in a straight edge integral to the mounting arm body and wherein at least one of the plurality of sidewalls terminates at the curved end in a curved edge integral to the mounting arm body, wherein the curved edge curves inwardly in a direction toward the straight end of the mounting arm and is symmetrical about the mounting arm axis, and wherein at least one mounting aperture is provided within the mounting arm body.

2. The mounting arm of claim 1, wherein the plurality of sidewalls comprises at least four sidewalls and wherein the at least one of the plurality of sidewalls that terminates at the curved end in the curved edge comprises a first opposing pair of the at least four sidewalls.

3. The mounting arm of claim 2, wherein a second opposing pair of the at least four sidewalls terminates at the curved end in a straight edge integral to the mounting arm body.

4. The mounting arm of claim 3, wherein the at least four sidewalls is exactly four sidewalls.

5. The mounting arm of claim 1, wherein the curved edge comprises a radius of curvature of 1 to 3 inches, inclusive.

6. The mounting arm of claim 1, wherein the at least one mounting aperture is formed integrally with one of the plurality of sidewalls.

7. The mounting arm of claim 1, wherein the at least one mounting aperture comprises a mounting aperture axis that is substantially parallel to the mounting arm axis.

8. The mounting arm of claim 1, wherein the mounting surface comprises a flat mounting surface and wherein the straight edge of each of the plurality of sidewalls at the straight end is configured to contact the flat mounting surface when the light fixture is mounted on the flat mounting surface with the mounting arm.

9. The mounting arm of claim 1, wherein the mounting surface comprises a curved mounting surface, wherein at least one of the plurality of sidewalls terminates at the curved end in a straight edge that is integral to the mounting arm body and that is configured to contact the curved mounting surface when the light fixture is mounted on the curved mounting surface with the mounting arm.

10. The mounting arm of claim 9, wherein the curved edge at the curved end is configured to contact the curved mounting surface when the light fixture is mounted on the curved mounting surface with the mounting arm.

11. The mounting arm of claim 10, wherein the curved edge comprises a radius of curvature and wherein the curved mounting surface comprises a radius of curvature that is substantially the same as the radius of curvature of the curved edge.

12. The mounting arm of claim 1, wherein the mounting arm comprises an aluminum extrusion.

13. The mounting arm of claim 1, wherein the mounting arm body comprises a length and an outer profile that is consistent along the length of the mounting arm body.

14. A light fixture assembly comprising:
   a. a light fixture comprising a housing wall and a recessed portion in the housing wall having a recess shape; and
   b. a mounting arm comprising four sidewalls that define a substantially hollow mounting arm body extending along a mounting arm axis and having a mounting arm cross-sectional shape, a straight end, and a curved end opposite the straight end, wherein:
      i. each of the four sidewalls at the straight end terminate in a straight edge integral to the mounting arm body;
      ii. a first opposing pair of the four sidewalls terminates at the curved end in a curved edge integral to the mounting arm body and that curves inwardly in a direction toward the straight end of the mounting arm and that is symmetrical about the mounting arm axis; and
      iii. a second opposing pair of the four sidewalls terminate at the curved end in a straight edge integral to the mounting arm body,
   wherein the recessed portion is configured to receive the straight end when the mounting arm is in a first orientation and the curved end when the mounting arm is in a second orientation.

15. The light fixture assembly of claim 14, wherein the light fixture further comprises at least one securing aperture formed in the recessed portion and having a securing aperture axis and wherein the mounting arm further comprises at least one mounting aperture provided within the mounting arm body and having a mounting aperture axis, wherein, when the straight end or the curved end of the mounting arm is received within the recessed portion of the light fixture, the securing aperture axis and the mounting aperture axis are substantially collinear.

16. The light fixture assembly of claim 15, further comprising a fastener that extends at least partially through the at least one securing aperture and the at least one mounting aperture.

17. The light fixture of claim 16, wherein an inner surface of the at least one securing aperture is threaded and wherein an end of the fastener is threaded such that the end of the fastener is screwed directly into the at least one securing aperture.

18. The light fixture assembly of claim 14, wherein the recessed shape and the mounting arm cross-sectional shape are approximately the same.

19. A method of mounting a light fixture onto a mounting surface comprising:
   a. providing a light fixture having a housing wall and a recessed portion in the housing wall having a recess shape, wherein at least one securing aperture having a securing aperture axis is formed in the recessed portion;
   b. providing a mounting arm comprising four sidewalls that define a substantially hollow mounting arm body extending along a mounting arm axis and having a mounting arm cross-sectional shape, a straight end, and a curved end opposite the straight end, wherein:
      i. each of the four sidewalls at the straight end terminate in a straight edge integral to the mounting arm body;
      ii. a first opposing pair of the four sidewalls terminates at the curved end in a curved edge integral to the mounting arm body and that curves inwardly in a direction toward the straight end of the mounting arm and that is symmetrical about the mounting arm axis;
      iii. a second opposing pair of the four sidewalls terminate at the curved end in a straight edge integral to the mounting arm body; and
      iv. at least one mounting aperture having a mounting aperture axis is provided within the mounting arm body; and
   c. mounting the mounting arm between the light fixture and mounting surface such that:
      i. if the mounting surface is flat, the curved end of the mounting arm is positioned within the recessed portion of the housing wall and the straight end of the mounting arm is adjacent the mounting surface; and
      ii. if the mounting surface is curved, the straight end of the mounting arm is positioned within the recessed portion of the housing wall and the curved end of the mounting arm is adjacent the mounting surface.

20. The method of claim 19, wherein positioning the mounting arm between the light fixture and mounting surface comprises securing a first end of a fastener to the light fixture and positioning the fastener within the at least one mounting aperture of the mounting arm.

21. The method of claim 20, wherein an internal surface of the at least one securing aperture of the light fixture is threaded, wherein the first end of the fastener is threaded, and wherein securing the first end of the fastener to the light fixture comprises screwing the first end of the fastener into the at least one securing aperture.

22. The method of claim 20, further comprising securing the fastener within the at least one mounting aperture of the mounting arm with a nut.

* * * * *